(12) United States Patent
Schulnig et al.

(10) Patent No.: US 11,027,929 B2
(45) Date of Patent: Jun. 8, 2021

(54) MODULAR BEARING DEVICE FOR AT LEAST ONE PAIR OF GRIPPING ARMS, AND METHOD FOR ASSEMBLING SAME

(71) Applicant: Tyrolon-Schulnig GmbH, Hochfilzen (AT)

(72) Inventors: Elmar Schulnig, Fieberbrunn (AT); Ludwig Schulnig, St. Jakob in Haus (AT)

(73) Assignee: Tyrolon-Schulnig GmbH, Hochfilzen (AT)

( * ) Notice: Subject to any disclaimer, the term of this patent is extended or adjusted under 35 U.S.C. 154(b) by 42 days.

(21) Appl. No.: 16/466,261

(22) PCT Filed: Oct. 26, 2017

(86) PCT No.: PCT/EP2017/077386
§ 371 (c)(1),
(2) Date: Jun. 3, 2019

(87) PCT Pub. No.: WO2018/108370
PCT Pub. Date: Jun. 21, 2018

(65) Prior Publication Data
US 2020/0071088 A1    Mar. 5, 2020

(30) Foreign Application Priority Data

Dec. 13, 2016 (WO) ................. PCT/EP2016/080810
Mar. 9, 2017 (DE) ......................... 102017105016.7

(51) Int. Cl.
| | | |
|---|---|---|
| *B65G 47/86* | (2006.01) | |
| *B65G 47/90* | (2006.01) | |
| *B25J 15/02* | (2006.01) | |
| *B65G 29/00* | (2006.01) | |

(Continued)

(52) U.S. Cl.
CPC ........... *B65G 47/847* (2013.01); *B65G 47/90* (2013.01); *B25J 15/0226* (2013.01); *B65G 29/00* (2013.01);
(Continued)

(58) Field of Classification Search
CPC ...... B65G 47/84; B65G 47/90; B65G 47/847; B67C 3/24; B25J 15/10; B25J 9/123
(Continued)

(56) References Cited

U.S. PATENT DOCUMENTS 3,155,228 A * 11/1964 Norwood .................. B67C 3/24
                                                            198/803.7
5,893,700 A *  4/1999 Kronseder .............. B08B 9/426
                                                            198/803.9

(Continued)

FOREIGN PATENT DOCUMENTS

DE         29501941      5/1995
DE       102014111564    2/2016

*Primary Examiner* — Paul T Chin
(74) *Attorney, Agent, or Firm* — Cesari and McKenna, LLP

(57) ABSTRACT

An apparatus and assembly of a modular bearing device for a pair of gripper arms in a mirror-inverted configuration seated on a support plate for the gripping, holding and guiding of bottle-like containers. The gripper arms are movable from a gripping position into an open position and vice versa by means of a rotatably mounted cam control shaft, each gripper arm having a bearing pin for the pivotal supporting the respective gripping arm and a base plate with a receiving opening running through it for the pivotal supporting of the cam control shaft, wherein the bearing pins are fixed to one side of the base plate, and releasably fastening at least one of the gripper arms on the support plate. With the objective of quick and easy dismantling/assembling, the bearing device is characterized in that the first bearing pin or the second bearing pin is designed as a (Continued)

sleeve for receiving the fastening, the through-hole of which aligns with a receiving opening in the base plate in the axial direction of the sleeve.

20 Claims, 4 Drawing Sheets

(51) Int. Cl.
    *B67C 3/24*    (2006.01)

(52) U.S. Cl.
    CPC ........ *B65G 2201/0244* (2013.01); *B67C 3/24* (2013.01)

(58) Field of Classification Search
    USPC ................... 294/116, 86.4; 198/469.1, 803.9
    See application file for complete search history.

(56) References Cited

U.S. PATENT DOCUMENTS

| | | | |
|---|---|---|---|
| 8,672,376 | B1 | 3/2014 | Wilson et al. |
| 9,022,442 | B2* | 5/2015 | Rousseau ............. B25J 15/0028 294/90 |
| 9,878,483 | B2* | 1/2018 | Leroux ............... B29C 49/4205 |
| 10,633,197 | B2* | 4/2020 | Nava .................... B25J 15/0226 |
| 2012/0118706 | A1* | 5/2012 | Schulnig ............. B65G 47/847 198/803.3 |
| 2018/0273368 | A1* | 9/2018 | Rillema ............... B65G 47/847 |
| 2019/0322466 | A1* | 10/2019 | Schulnig ................ B65G 47/90 |
| 2020/0039761 | A1* | 2/2020 | Schulnig ............. B65G 47/847 |
| 2020/0191193 | A1* | 6/2020 | Schulnig ................ B65G 47/90 |

* cited by examiner

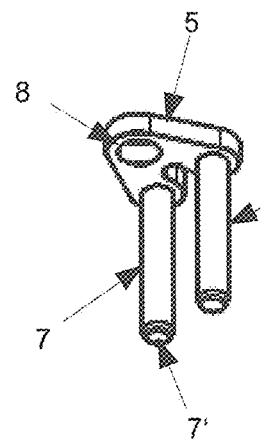
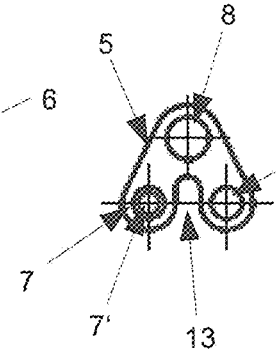
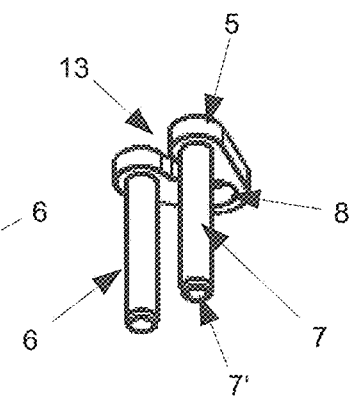
Fig. 1a Fig. 1b Fig. 1c
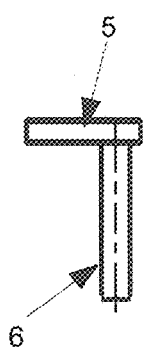
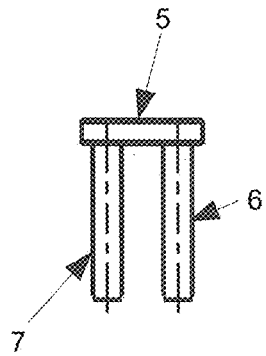
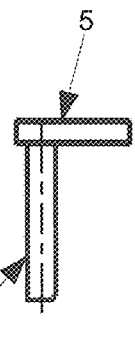
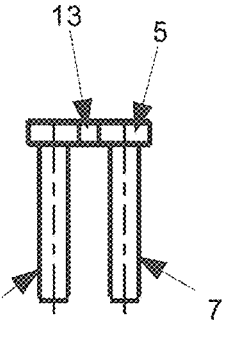
Fig. 1d Fig. 1e Fig. 1f Fig. 1g
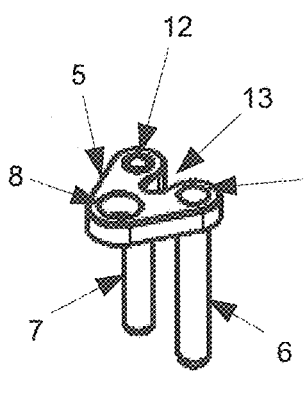
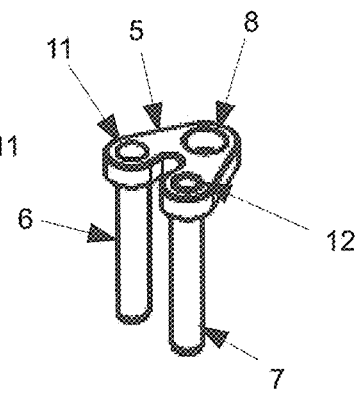
Fig. 1h Fig. 1i

MODULAR BEARING DEVICE FOR AT LEAST ONE PAIR OF GRIPPING ARMS, AND METHOD FOR ASSEMBLING SAME

CROSS REFERENCE TO RELATED APPLICATIONS

This application is the National Stage of International Application No. PCT/EP2017/077386, filed Oct. 26, 2017, which claims the benefit of German Patent Application No. 10 2017 105 016.7 filed on Mar. 9, 2017 and claims the benefit of International Patent Application No. PCT/EP2016/080810 filed on Dec. 13, 2016. The contents of these applications are hereby incorporated by reference in their entirety.

TECHNICAL FIELD

The present disclosure relates to modular bearing device for a pair of gripping arms and a method for assembling the same, in particular on a support plate of a gripping and transport device for containers.

The present invention relates to a modular bearing device for at least one pair of gripper arms and a method for its assembly, in particular on a support plate of a gripping and transport device for containers.

Gripping and transport devices for gripping, holding and/or guiding containers are already known from the prior art, particularly by the name of "clamping stars." They are primarily used in the production line processing of containers/receptacles provided in particular for cleaning, labeling and/or filling with liquids or other bulk material.

To be understood by the term "container" in the context of the present invention is in particular, but not exclusively, containers having a substantially circular cross section, e.g. bottles, cans or glassware, which consist of glass, metal or plastic according to the respective requirements.

Understood by the term "support plate" in the context of the present invention is in particular, but not exclusively, a circular or circular segmented plate with a radius which is a multiple of the plate height or thickness respectively. In the context of the present invention, the term "support plate" is also to encompass a circular or circular segmented support ring. Such a support ring can exhibit a concentric inner ring or an inner plate concentric with the support ring, whereby the inner ring/inner plate is connected to the support ring by radial struts. Such a support plate or such a support ring can consist for example of metal, steel, aluminum or an alloy. A support plate or support ring made from a plastic is also possible.

The term "modular," or "module" respectively, refers to a device/mechanism able to be used and in particular manufactured as one unit, e.g. in relatively few manufacturing steps. This also means that the unit can preferably be integrally formed.

In order to transport a container, a gripping device with at least one pair of gripper arms normally grasps underneath the collar, e.g. in the case of bottles, and/or around the mid-section of the container. A gripper arm pair thereby comprises a first gripper arm and a second gripper arm of mirror-inverted configuration to the first gripper arm. A cam control shaft thereby functions as opening means and a spiral spring, for example, as closure means of the gripping device. However, there is also the alternative possibility of the cam control shaft serving as closure means and the spiral spring as opening means. In the end, the cam control shaft of a gripping device is driven by an actuating means, via which the gripping device can be opened and closed. In addition to the spiral spring, repelling and/or attracting pairs of magnets and/or an elastically deformable tongue of the gripper arm can also be used depending on the positioning relative to the pivot axis of a gripper arm.

Gripping devices are normally concentrically positioned and fixed on a circular support plate about the drive axle or respectively drive shaft of the gripping and transport device. This thereby ensures that after a certain rotational movement of the support plate, the same or another gripping device ends up at the same position again or at a predetermined position at which the gripping device stably grips or again releases a container to be transported. Depending on, inter alia, the size of the support plate, in particular its radius, a maximum number of gripping devices can be fixed to the support plate. The number of gripping devices on the support plate likewise depends both on the size of the gripping devices themselves as well as the size of the containers to be transported.

The bulk processing of such containers/receptacles entails the necessary adapting of the gripping and transport devices to the respectively different container types and/or operating conditions. Such container types can substantially differ from one another in their general shape, in particular their height, width and/or diameter. The operating conditions can, for example, require changing or replacing the number and/or type of gripping devices respectively.

In addition to such adaptations, there may also be the replacing of defective or worn gripper arm pairs which are no longer able to grip and hold a container or at least no longer able to transport properly. The gripper arms are subject to attrition/wear and thus a statistical service life resulting from mechanical load during movement from the open position into the gripping position and vice versa as well as when holding the container. As soon as the gripper arms are worn to the point of no longer being able to perform their gripping function, said gripper arms need to be replaced. This is the case when, for example, gripper arms made of metal became warped due to wear or at least parts of plastic gripper arms break off.

In the situations cited above, in which the gripper arms need to be replaced and/or adapted, the system is stopped and the relevant gripper arms replaced manually. Such planned or unplanned interruptions of operation have a negative impact on the operating efficiency of the systems and should thus be as brief as possible.

A bearing unit on which a pair of gripper arms is arranged and supported is known from printed publication DE 10 2014 111 564. The bearing unit enables an operator or company respectively to replace a gripper arm pair relatively quickly compared to other prior art.

However, the prior art still has numerous disadvantages. For example, the afore-mentioned bearing unit is of relatively large size and not particularly easily mountable on a transport star. Furthermore, the bearing unit consists of a plurality of individual separate components which complicates handling when replacing a gripper arm pair.

It is therefore the task of the present invention to devise a bearing device which eliminates or at least minimizes the disadvantages known from the prior art and in particular enables fast and easy assembly of the gripping devices as well as minimizes target surfaces for dirt.

The invention solves this task with the bearing device according to claim 1.

Accordingly, a modular bearing device for a gripper arm pair comprising at least one first gripper arm and one second gripper arm of mirror-inverted configuration to the first is provided. The at least one gripper arm pair seated on a support plate for the gripping, holding and guiding of particularly bottle-like containers is thereby movable from a gripping position to an open position or vice versa by means of a rotatably mounted cam control shaft. The bearing device is configured with a first bearing pin for the pivotal supporting of the at least one first gripping arm, a second bearing pin for the pivotal supporting of the at least one second gripping arm, a base plate with a receiving opening running through it for the pivotal supporting of the cam control shaft, wherein the bearing pins are fixed to one side of the base plate. The bearing device is additionally configured to be releasably fixed and/or connectable to the support plate via fixing means. The bearing device is thereby characterized in that the first bearing pin or the second bearing pin is designed as a sleeve for receiving the fixing means, the through-hole of which aligns with a receiving opening in the base plate in the axial direction of the sleeve.

The bearing device according to the invention has the advantage of a plurality of functions being able to be fulfilled, in particular simultaneously, with a relatively low number of components or respectively elements. The bearing pins serve both as bearing elements for the gripper arms as well as also fixing elements on the support plate. At least one bearing pin also serves as a receiving element for the fixing means. With two receiving openings, the base plate functions as a mounting base for the two bearing pins in order to maintain their spacing and parallel arrangement. Additionally, the base plate serves as a bearing for the cam control shaft by way of a third receiving opening.

A further advantage lies in the compact structure on which the at least one pair of gripper arms is arranged prior to assembly on a support plate and which can be pre-equipped with appropriate opening and/or closure means (e.g. springs, magnets, etc.). There is thus the prospect of preparing commensurate gripping devices with bearing devices as spare parts prior to maintenance and/or assembling them quickly during servicing.

The bearing device thus forms a compact and simple way of securing at least one pair of gripper arms as well as supporting a cam control shaft. When servicing a gripping and transport device, a gripper arm pair can accordingly be replaced faster compared to the prior art and with a fewer number of steps. Downtimes and servicing times are thus shortened and thus more economical, and the usage and operation of a gripping and transport device with the inventive bearing devices extended and more cost-effective for a company. Even the manufacture of the bearing device is economical due to its low number of parts and simple structure.

In one advantageous embodiment, the base plate comprises one receiving opening each for receiving and fixing a bearing pin, into which one end of the bearing pin can in each case be inserted and secured. These receiving openings are easily and economically producible and allow differently shaped bearing pins of e.g. different lengths and/or diameters to be introduced into the base plate in the manufacture of the bearing device. The bearing pins are thereby preferably fixed in the receiving openings of the base plate by press fit.

Preferably, the base plate and the bearing pins are integrally formed. That means that the bearing device can consist of base plate and bearing pin from a single piece of material, e.g. a plastic injection molding or a milled/turned metal piece. This thereby eliminates complicated and laborious assembling steps for the bearing device.

It has likewise proven advantageous for the base plate to exhibit a material recess between the two receiving openings. The material savings reduces the weight and costs of the bearing device. Additionally, the material recess is preferably configured such that the tractive and tensile forces generated by the gripping and opening motion are distributed on the base plate and premature material fatigue or cracks from concentrated overloads prevented.

Furthermore, the fixing means can be a screw exhibiting a thread on its end opposite the screw head by means of which the screw can be releasably fastened to the at least one gripper arm pair in or on the support plate while fixing the base plate. A thread can be quickly and easily produced by a respective drill (for a hole) or cutter (for a pin) and provides a sufficiently strong and simultaneously releasable fixing between the screw and receiving opening and thus for the bearing device.

It is noted at this point that the bearing device according to the invention is designed such that it is connectable to a support plate and releasably affixable; this can ensue by means of an additional fixing means (e.g. in the form of a screw) and/or by means of a locking system (e.g. in the form of a bayonet connector) between the receiving opening and bearing pin.

In one alternative embodiment, no receiving opening is provided in the base plate of the bearing device and the base plate accordingly scaled down since the cam control shaft, for example, is of shorter form and thus requires no additional supporting. The receiving opening can likewise be formed on the rear region of the base plate when the cam control shaft is not functioning as an opening means but rather a closure means.

Then again, in an alternative embodiment, no continuous through-hole is required in one of the bearing pins of the bearing device but rather only a countersink with internal thread formed from below. This enables the possibility of, for example, screwing a screw into the internal thread of the bearing pin from the underside and through the support plate and thus releasably fixing the bearing device.

The invention likewise relates to a method for assembling a modular bearing device according to the invention on a support plate, in particular a known per se clamping star, wherein the support plate for the at least one pair of gripper arms in each case axially comprises a first receiving opening for receiving and fixing the first bearing pin for the pivotal supporting of the at least one first gripper arm, a second receiving opening for receiving and fixing the second bearing pin for the pivotal supporting of the at least one second gripper arm, and a third receiving opening for rotatably accommodating the cam control shaft for the opening and/or closing of the at least one pair of gripper arms. The method is thereby characterized by the following method steps:

the at least one first gripper arm and the at least one second gripper arm are attached to the associated first and second bearing pin fixed at or on the base plate or integrally formed therewith;

the modular bearing device is placed on the support plate with the at least one gripper arm pair such that the free ends of the bearing pins can be introduced into the associated receiving openings or arranged above said receiving openings and the base plate distanced from the support plate;

the fixing means is inserted from the side of the base plate going through the first or second bearing pin formed as a sleeve and releasably secured with the thread in or on the support plate.

The advantage of the method lies in the low number of assembly steps required to secure a bearing device on a support plate. Since few steps are needed to ultimately fix the bearing device on the support plate, the at least one gripper arm pair can be pre-arranged or attached in preparation for assembling on the bearing device. This saves time and thus personnel costs in the commissioning and maintenance of a gripping and transport device for containers.

As the next method step, the cam control shaft is preferably introduced from the underside of the support plate into the third receiving opening associated with the cam control shaft and disposed in the support plate as well as into the receiving opening going through the base plate for the pivotal supporting of the cam control shaft. This step has the advantage of the cam control shaft being able to be arranged and secured in the support plate even without the affixed bearing device. The receiving opening of the base plate gives the cam control shaft further support, which increases its stability.

Advantageously, the cam control shaft in the third receiving opening of the support plate is rotatably secured against falling out in the next method step. This securing can thereby ensue by means of a locking pin. In addition to securing, this step, or the respective locking element respectively, can also form a bearing which allows the cam control shaft to axially pivot in one position.

Further details and advantages of the invention are now to be described in greater detail on the basis of some of the preferential exemplary embodiments depicted in the drawings. Shown are:

FIG. 1a a perspective view of a bearing device according to the invention from below;

FIG. 1b a bottom view of the bearing device from FIG. 1a;

FIG. 1c a further perspective view of the bearing device from FIG. 1a from below;

FIG. 1d a side view of the bearing device from FIG. 1a from the right;

FIG. 1e a frontal view of the bearing device from FIG. 1a;

FIG. 1f a side view of the bearing device from FIG. 1a from the left;

FIG. 1g a rear view of the bearing device from FIG. 1a;

FIG. 1h a perspective view of the bearing device from FIG. 1a from above;

FIG. 1i a further perspective view of the bearing device from FIG. 1a from above.

FIG. 2a a bearing device according to the invention with two attached pairs of gripper arms arranged on a support plate and on which the fixing means is disengaged;

FIG. 2b the bearing device of FIG. 2a, spaced or respectively distanced from the support plate;

FIG. 2c a further depiction of FIG. 2b, wherein the gripping device with the bearing device and the gripper arm pairs is shown in an exploded view;

FIG. 2d a further depiction which, except for a locking pin removed from the support plate, is identical to FIG. 2c;

FIG. 2e a further depiction which, except for a cam control shaft removed from the support plate, is identical to FIG. 2d; and FIG. 3 a top view of part of a support plate fit with concentrically arranged gripping devices.

FIG. 1a shows a perspective view from below of a bearing device according to the invention which is formed by a base plate 5 and two bearing pins 6 and 7. The base plate 5 is of axially symmetrical configuration and exhibits a planar underside and a planar upper side. A circular receiving opening 8 extends in the base plate 5 from the underside to the upper side of the base plate 5, in particular at its frontal region, for supporting a cam control shaft. The center point of the circular receiving opening 8 lies on an imaginary symmetrical axis (not plotted) of the base plate 5. The bearing pins 6, 7 are fixed in the base plate 5 perpendicular to the underside and parallel to each other. The bearing pins 6, 7 are furthermore of the same length and have the same diameter. As a result of the symmetry, the two bearing pins 6, 7 are at the same distance to the imaginary symmetrical axis of the base plate 5. While the first bearing pin 6 is solid, the second bearing pin 7 is hollow and comprises a through-hole 7' formed along its axis from the lower end to the upper end (not visible). A material recess can be seen at the rear region of the base plate 5 as will be depicted in detail in the following figures.

FIG. 1b shows a bottom view of the bearing device from FIG. 1a. The symmetrical configuration of the base plate 5 and the symmetrical arrangement of the aforementioned elements such as the receiving opening 8, bearing pins 6 and 7 as well as also material recess 13 in the base plate 5 is clearly visible here. The surface of the base plate 5; i.e. the underside/upper side, is substantially triangular with rounded edges, whereby the material recess forms an indentation extending from the rear side of the base plate 5.

FIG. 1c shows a further perspective view from below of the bearing device from FIG. 1a as formed by the base plate 5 and the two bearing pins 6 and 7.

FIG. 1d shows a side view of the bearing device from FIG. 1a from the right, wherein essentially the first bearing pin 6 and the base plate 5 can be seen. The first bearing pin 6 forms a right angle with the base plate 5. The thickness of the base plate 5 is less than the diameter of the bearing pin 6. It is pointed out that the dimensioning to the elements and/or sections of the bearing device are preferably selected in such a manner so as to provide on the one hand a stable and on the other a relatively lightweight bearing device.

FIG. 1e shows a frontal view of the bearing device from FIG. 1a with the base plate 5, the first bearing pin 6 and the second bearing pin 7. The arrangement of the elements corresponds to a π (pi symbol) with two right angles.

FIG. 1f shows a side view of the bearing device from FIG. 1a from the left, which essentially corresponds to a mirror-inverted FIG. 1d. Instead of the first bearing pin, the second bearing pin 7 is visible here.

FIG. 1g shows a rear view of the bearing device from FIG. 1a which, except for the depicted material recess 13, corresponds to a mirror-inverted FIG. 1e.

Figure 2A:
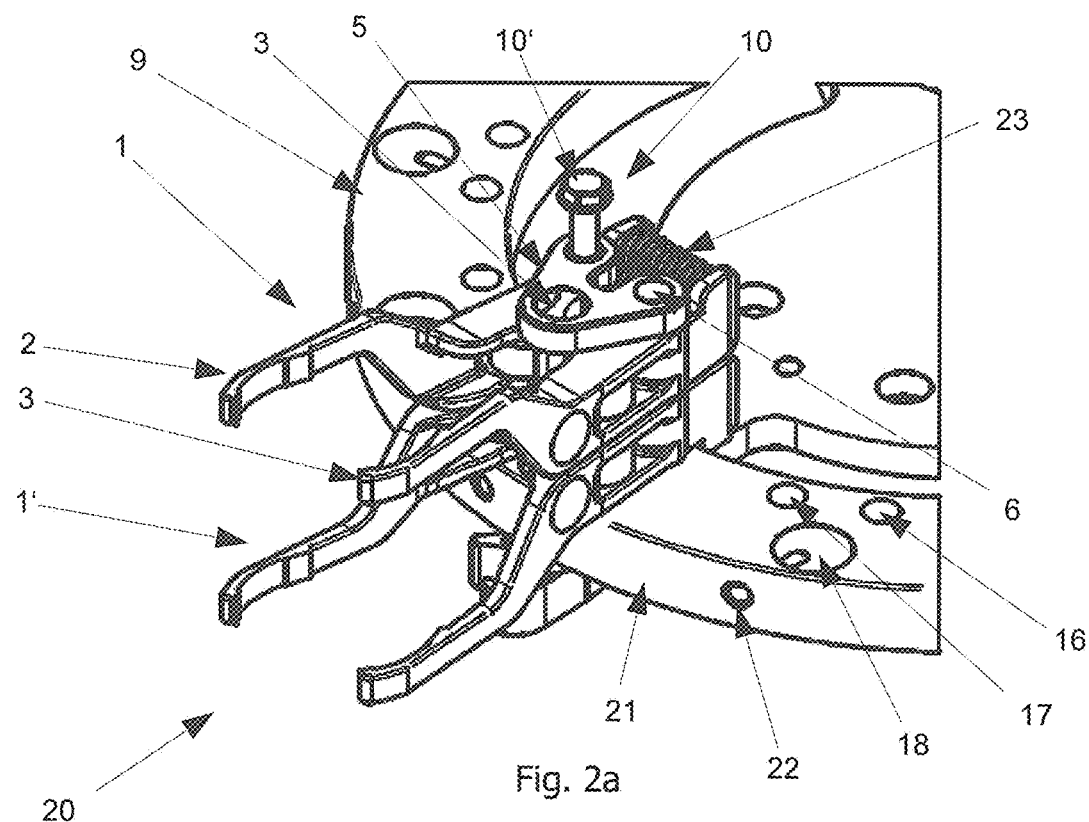

FIG. 1h shows a perspective view of the bearing device from FIG. 1a from above. Although all the relevant parts of the bearing device have already been noted for example in FIG. 1c, including the first and second bearing pin 6, 7, base plate 5, receiving opening 8 and material recess 13, and the upper side of the base plate 5 corresponds to the underside of the base plate 5, as commensurate with FIG. 1b, attention is drawn to the circularly depicted contours of the receiving openings 11 and 12. These receiving openings 11 and 12 serve as a mounting for the bearing pins 6 and 7 and preferably have the same internal diameter.

FIG. 1i shows a further perspective view of the bearing device from FIG. 1a from above.

FIG. 2a shows an inventive bearing device with two attached gripper arm pairs 1 and 1' which are arranged on a support plate 9 and on which the fixing means in the form of a screw 10 has been disengaged. This can be the first step in dismantling the bearing device or a gripping device 20 respectively from the support plate 9. The gripping device 20 is the unit which can grip, hold and transport a container.

To that end, the gripping device 20 comprises the inventive bearing device and, in this exemplary embodiment, two gripper arm pairs 1 and 1'. The bearing device is releasably fixed to the support plate 9 by a fixing means in the form of a screw 10 with a screw head 10'. The gripper arm pairs 1 and 1' each have two closure means in the form of a spring 23 which are arranged at the end of the gripper arms 2, 3, in particular between the first gripper arm 2 and the second gripper arm 3 of mirror-inverted configuration. A cam control shaft 3, which can be regarded as part of the gripping device 20, serves as the opening means since each gripping device 20 of a gripping and transport device has its own cam control shaft 3. The cam control shaft 3 is arranged in a third receiving opening 18 of the support plate 9 and rotatably fixed, in particular by means of a locking pin 19 (see subsequent FIG. 2d). The cam control shaft 3 is additionally arranged rotatably supported in the receiving opening 8 of the base plate 5 of the bearing device. The two bearing pins 6 (the second bearing pin 7 not properly discernible) of the bearing device are arranged in the first and second receiving openings 16 and 17 of the support plate 9, whereby part of the second receiving opening 17 comprises an internal thread (not visible) for the screw 10 for securing. The cited receiving openings 16 to 18 have a cylindrical form. The aforementioned locking pin 19 is inserted through a bore 22 of the outer lateral surface 21 of the support plate and extends to at least the third receiving opening 18.

Figure 2B:
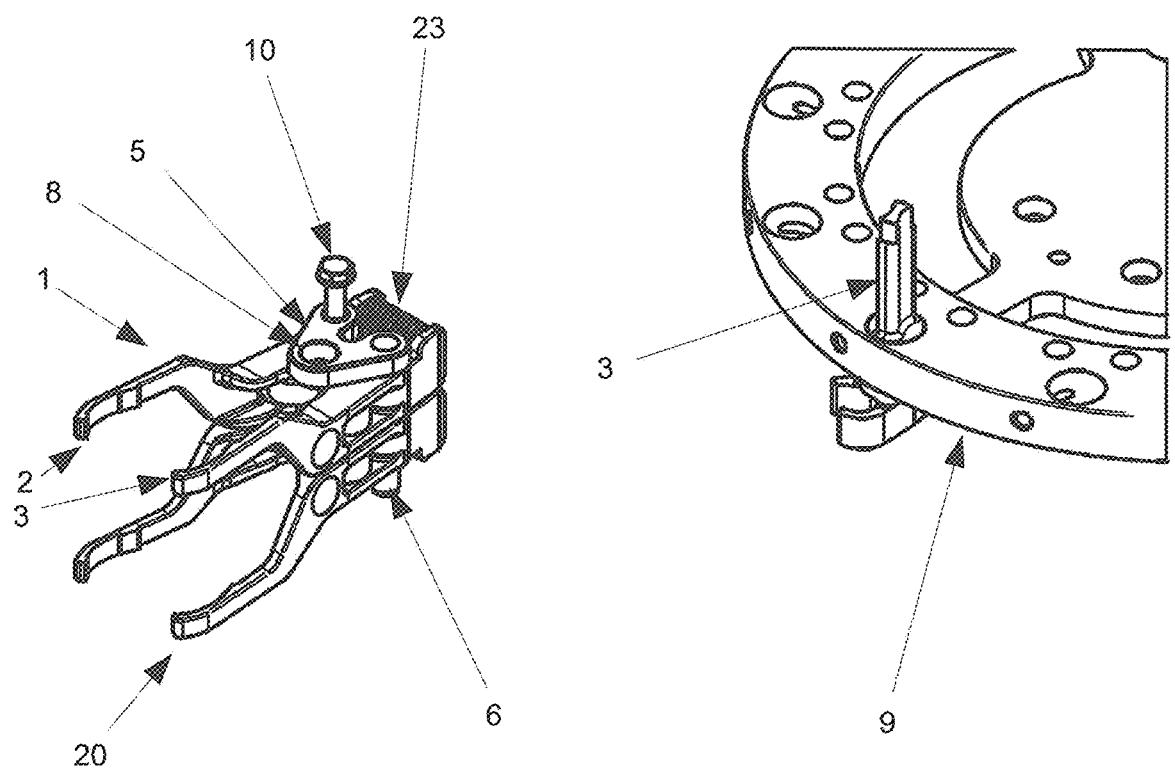

FIG. 2b shows the bearing device from FIG. 2a spaced or respectively distanced from the support plate 9. This can be the second step in dismantling the bearing device or the gripping device 20 respectively from the support plate 9.

Figure 2C:
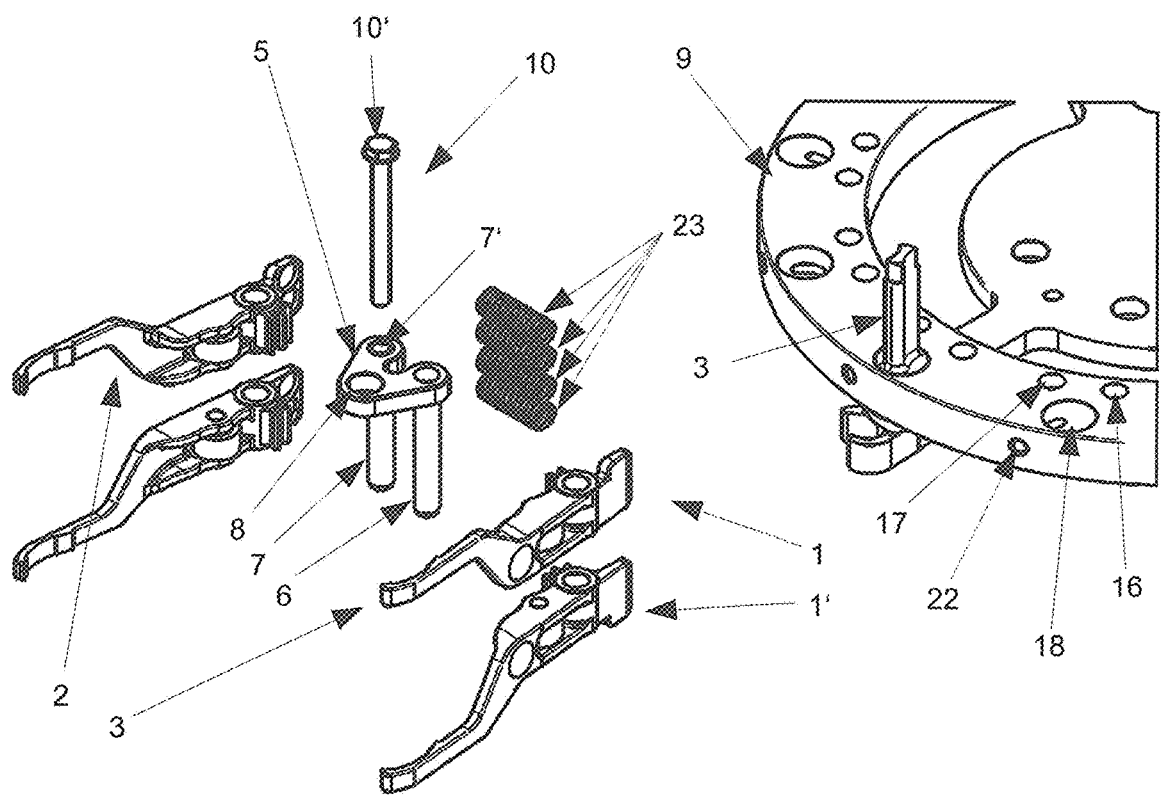

FIG. 2c shows a further depiction of FIG. 2b, wherein the gripping device 20 with the bearing device and the gripper arm pairs 1, 1 is shown in an exploded view. This can be regarded as the third step in dismantling the bearing device or the gripping device 20 respectively from the support plate 9, wherein the gripper arms 2, 3 have been taken off the bearing device, in particular their bearing pins 6, 7. The four springs 23 as closure means for the two gripper arm pairs 1 and 1' are readily visible.

Figure 2D:
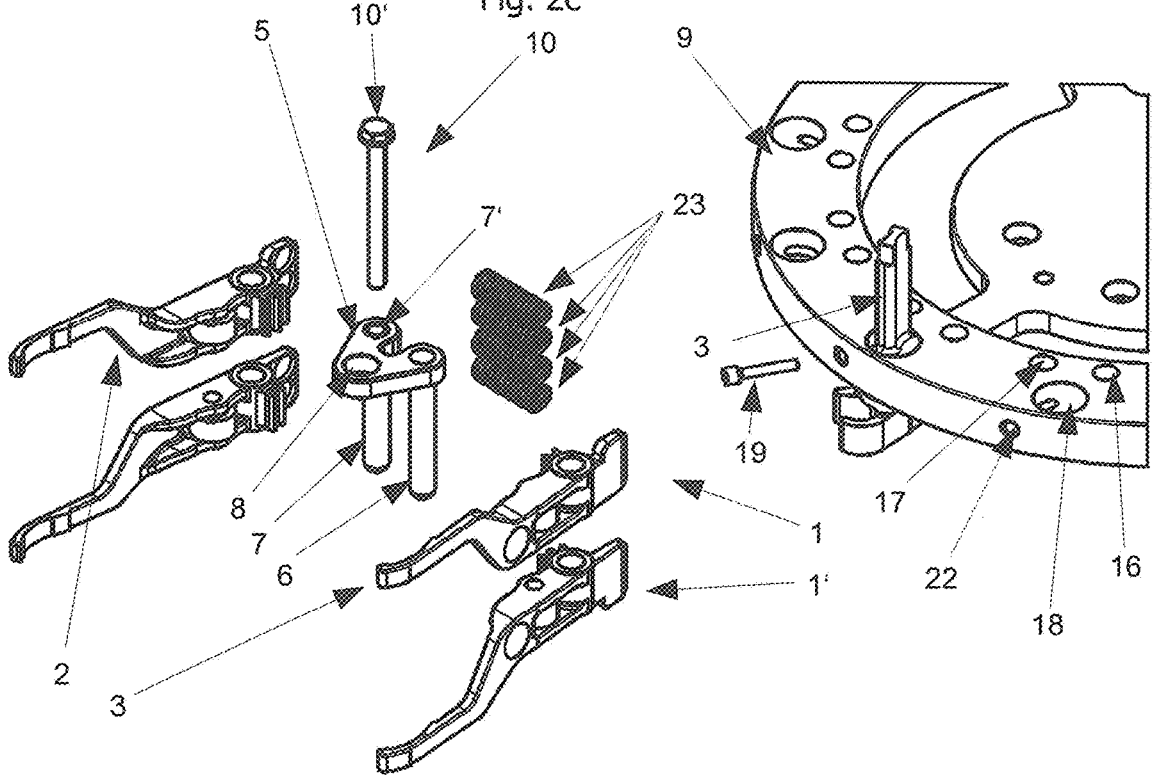

FIG. 2d shows a further depiction which, except for a locking pin 19 removed from the support plate 9, is identical to FIG. 2c. This can be regarded as the fourth step in dismantling the bearing device or the gripping device 20 respectively from the support plate 9.

Figure 2E:
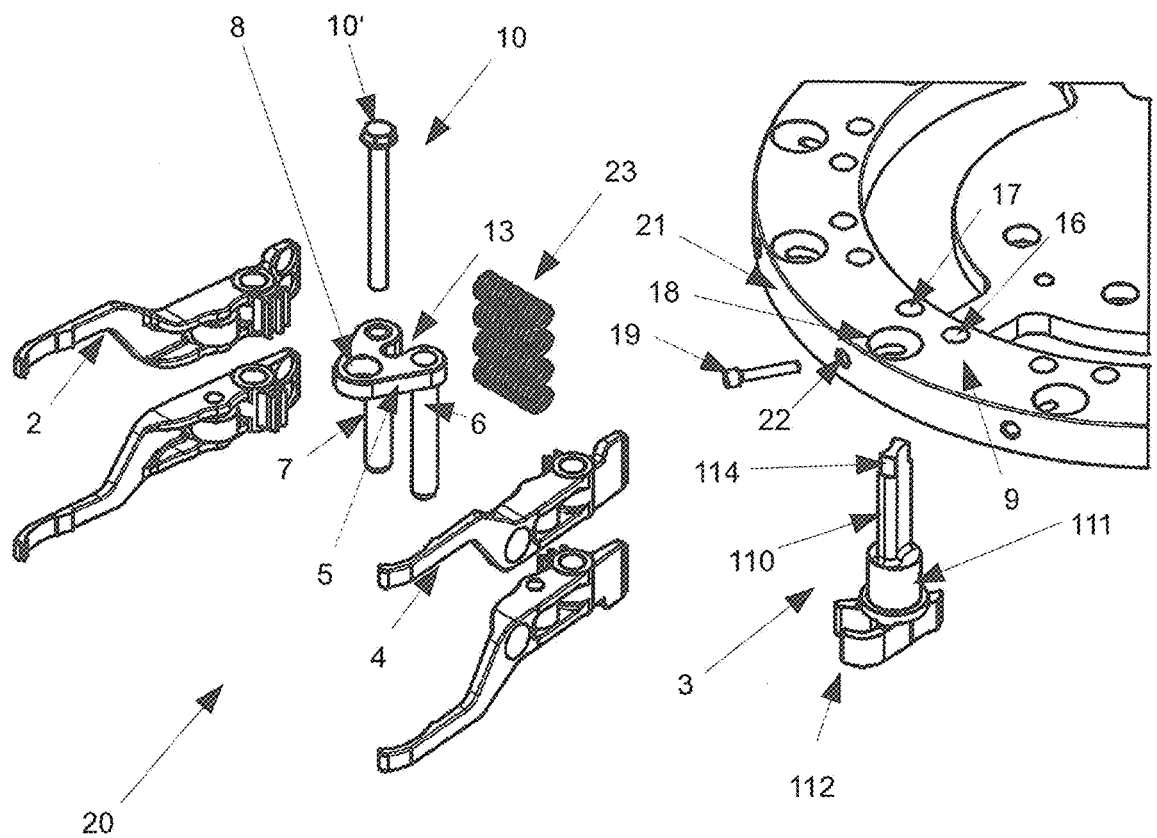

FIG. 2e shows a further depiction which, except for a cam control shaft 3 removed from the support plate 9, is identical to FIG. 2d. This can be regarded as the fifth step in dismantling the bearing device or the gripping device 20 respectively from the support plate 9.

The cam control shaft 3 comprises a rod-shaped upper section 110, a cylindrical middle section 111, and a base section 112 configured as a cam for opening or closing the gripping device 2. The rod-shaped upper section 110 exhibits a head section 114 having a diameter smaller than that of the rod-shaped upper section 110. The cam control shaft 3 comprises a base section 112 of hook-like shape.

The cam control shaft 3 is insertable or respectively arrangeable in the support plate 9 such that the cylindrical middle section 111, which has a height corresponding to the axial thickness of the support plate 9, forms a closed or respectively partially closed and/or flush surface with same. The gripper arm pair 1, 1' is thus not obstructed when closing into the grip position. Attached to the cylindrical middle section 111 of the cam control shaft 3 are an upper section 110 as well as a base section 112, whereby the latter exhibits e.g. a known per se pliers-like form; the form can also be described as hook-shaped or claw-shaped. The cam control shaft 3 has a tangential groove (not visible) in the region of the cylindrical middle section 111 which engages with the locking pin 19 from FIG. 2d and is rotatably fixed or supported respectively. The locking pin 19 is pushed into this tangential groove through the bore 22 and at least partly comprises an external thread which engages with the internal thread of the bore 22. The locking pin 19 can for example be a commercially standard screw, a hexagon socket head cap screw, or a set screw with a hexagon socket head. Of course, other components able to fulfill this function are also suitable for the locking pin 19. Moreover, although not depicted, the middle section 111 of the cam control shaft 3 can also in part exhibit an annular groove alternatively to the tangential groove into which the locking pin 19 then projects radially. The length of the annular groove is then to be dimensioned such that it enables the back and forth rotating of the cam control shaft 3 required to open and close a gripping device with the locking pin 19 projecting into same yet prevents the cam control shaft 3 from falling out of the third receiving opening 18. However, the alternative with the tangential groove is preferable because of the larger guide surface between the locking pin and groove compared to a locking pin radially engaging in a partially annular groove.

The upper section 110 of the cam control shaft 3 is rod-shaped in the depicted figure and of biconcave configuration in cross section and has a smaller diameter than the cylindrical middle section 110. It also comprises a head section 114, the diameter of which is smaller than that of the rod-shaped upper section 110.

With respect to the sequence of steps when dismantling the gripping device 20, the locking pin 19 (see FIG. 2d) can also first be removed from the support plate 9 and afterwards the control cam 3. The screw 10 and thus the bearing device can thereafter be disengaged and taken off the support plate 9 and the gripper arm pairs 1, 1' pulled off their bearing pins 6, 7.

Figure 3:
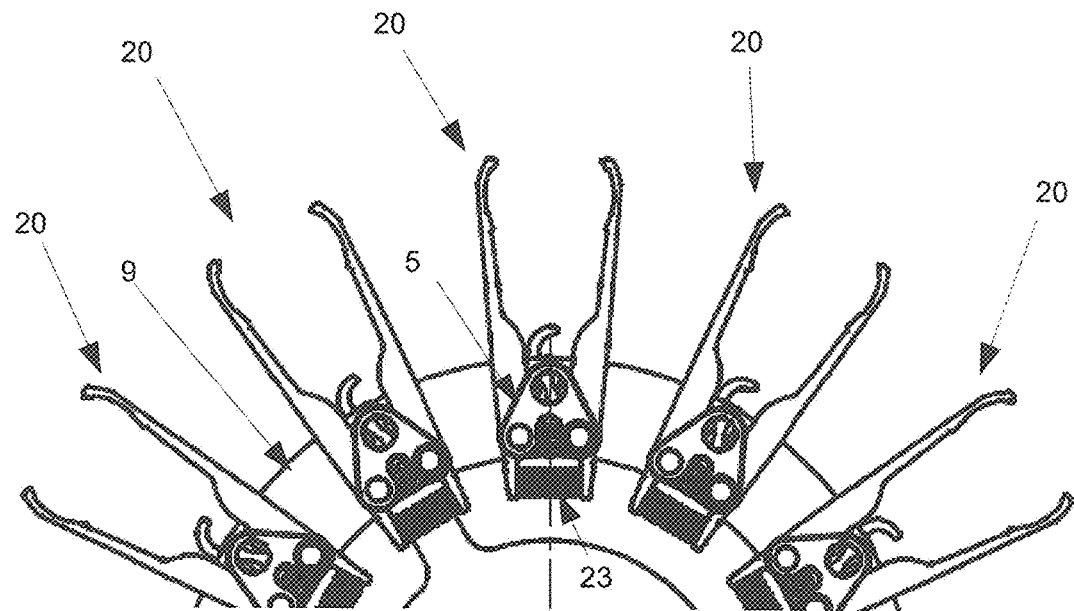

FIG. 3 shows a top view of part of a support plate 9 fitted with concentrically arranged gripping devices 20. The gripping devices 20 are directed outward away from the center point of the support plate 9. Each gripping device 20 exhibits its own bearing device with base plate 5 and bearing pin for the gripper arm pairs, wherein the gripper arm pairs are equipped with springs 23 as closure means.

LIST OF REFERENCE NUMERALS 1 gripper arm pair
1' second gripper arm pair
2 first gripper arm
3 cam control shaft
4 second gripper arm
5 base plate
6 first bearing pin
7 second bearing pin
7' through-hole
8 receiving opening for supporting a cam control shaft
9 support plate/ring
10 fixing means
10' screw head
11 receiving opening of base plate for the first bearing pin
12 receiving opening of base plate for the second bearing pin
13 material recess
14 thread
16 first receiving opening
17 second receiving opening 18 third receiving opening
19 locking pin
20 gripping device
21 outer lateral surface
22 bore for locking pin
23 spring
110 control section
111 cylindrical middle section
112 base section
114 head section

What is claimed is:

1. An apparatus comprising:
a gripper arm pair having a first gripper arm and a second gripper arm arranged in a mirror-inverted configuration with the first gripper arm, the gripper arm pair seated on a support plate for gripping, holding and guiding of bottle-like containers;
a rotatably mounted cam control shaft for moving the gripper arm pair from a gripping position to an open position and from the open position to the gripping position, the cam control shaft having a first bearing pin for pivotally supporting at least the first gripper arm, the cam control shaft further having a second bearing pin for pivotally supporting at least the second gripper arm;
a base plate having a first receiving opening running through the base plate, the first receiving opening pivotally supporting the cam control shaft; and
a fastener configured for releasable fastening of the gripper arm pair on the support plate by fixing the bearing pins to a first side of the base plate, wherein at least one of the bearing pins operates as a sleeve for receiving the fastener on the support plate, the at least one of the bearing pins including a through hole aligning with a second receiving opening in the base plate in an axial direction of the sleeve, wherein the base plate and the bearing pins are integrally formed.

2. The apparatus of claim 1, wherein the base plate includes a third receiving opening, wherein the second and third receiving openings are configured for insertion and securing of the bearing pins.

3. The apparatus of claim 2, wherein the base plate has a material recess between the second and third receiving openings.

4. The apparatus of claim 3, wherein the fastener comprises a screw having a thread and a screw head on opposite ends, the screw used for the releasable fastening of the gripper arm pair on the support plate while fixing the bearing pins to the base plate.

5. The apparatus of claim 2, wherein the fastener comprises a screw having a thread and a screw head on opposite ends, the screw used for the releasable fastening of the gripper arm pair on the support plate while fixing the bearing pins to the base plate.

6. The apparatus of claim 1, wherein the base plate has a material recess between the second receiving opening and a third receiving opening.

7. The apparatus of claim 1, wherein the fastener comprises a screw having a thread and a screw head on opposite ends, the screw used for the releasable fastening of the gripper arm pair on the support plate while fixing the bearing pins to the base plate.

8. A method comprising:
assembling a modular bearing device having a first gripper arm and a second gripper arm arranged in a mirror-inverted configuration with the first gripper arm, the gripper arms seated on a support plate for gripping, holding and guiding of bottle-like containers, by
attaching the first gripper arm to a first bearing pin and the second gripper arm to a second bearing pin to provide pivotal support for the gripper arms, wherein the bearing pins are integrally formed with a base plate;
placing the modular bearing device on the support plate such that free ends of the bearing pins are inserted into first and second receiving openings in the support plate;
inserting a fastener through the base plate and through the first bearing pin formed as a sleeve; and
securing the fastener to one of a thread disposed in the support plate and a thread disposed on the support plate.

9. The method of claim 8, wherein the assembling of the modular bearing device further comprises:
inserting a cam control shaft from an underside of the support plate into a third receiving opening disposed in the support plate; and
inserting the cam control shaft into a fourth receiving opening going through the base plate for pivoting the cam control shaft.

10. The method of claim 9, wherein the assembling of the modular bearing device further comprises:
rotatably securing the cam control shaft in the third receiving opening against falling out.

11. The method of claim 10, wherein the cam control shaft is rotatably secured by a locking pin.

12. The method of claim 8, wherein the assembling of the modular bearing device further comprises screwing a screw from an underside of the support plate into a thread of a countersink in the second bearing pin.

13. A method comprising:
assembling a modular bearing device having a first gripper arm and a second gripper arm arranged in a mirror-inverted configuration with the first gripper arm, the gripper arms seated on a support plate for gripping, holding and guiding of bottle-like containers, by
attaching the first gripper arm to a first bearing pin and the second gripper arm to a second bearing pin to provide pivotal support for the gripper arms, wherein the bearing pins are integrally formed with a base plate;
placing the modular bearing device on the support plate such that free ends of the bearing pins are configured above the support plate disposed with first and second receiving openings with the base plate distanced from the support plate;
inserting a fastener through the base plate and through the first bearing pin formed as a sleeve; and
securing the fastener to one of a thread disposed in the support plate and a thread disposed on the support plate.

14. The method of claim 13, wherein the assembling of the modular bearing device further comprises:
inserting a cam control shaft from an underside of the support plate into a third receiving opening disposed in the support plate; and
inserting the cam control shaft into a fourth receiving opening going through the base plate for pivoting the cam control shaft.

15. The method of claim 14, wherein the assembling of the modular bearing device further comprises:
rotatably securing the cam control shaft in the third receiving opening against falling out.

16. The method of claim 15, wherein cam control shaft is rotatably secured by a locking pin.

17. A modular bearing device comprising:
- a first gripper arm and a second gripper arm arranged in a mirror-inverted configuration with the first gripper arm, the gripper arms seated on a support plate for gripping, holding and guiding of bottle-like containers;
- a rotatably mounted cam control shaft for moving the gripper arms from a gripping position to an open position and from the open position to the gripping position, the cam control shaft having a first bearing pin for pivotally supporting at least the first gripper arm, the cam control shaft further having a second bearing pin for pivotally supporting at least the second gripper arm;
- a base plate having a rear region to receive and pivotally support the cam control shaft; and
- a fastener configured to releasably fasten the gripper arms on the support plate by fixing the bearing pins to first side of the base plate, wherein at least one of the bearing pins operates as a sleeve for receiving the fastener on the support plate, the at least one of the bearing pins including a through hole aligning with a second receiving opening in the base plate in an axial direction of the sleeve, wherein the base plate and the bearing pins are integrally formed.

18. The modular bearing device of claim 17 wherein the fastener comprises a screw having a thread and a screw head on opposite ends, the screw used for the releasable fastening of the gripper arms on the support plate while fixing the bearing pins to the base plate.

19. The modular bearing device of claim 17 wherein another of the at least one of the bearing pins includes a thread of a countersink in the second bearing pin for screwing a screw from an underside of the support plate into the thread of the countersink.

20. The modular bearing device of claim 17 further comprising a locking pin to rotatably secure the cam control shaft to the support plate.

* * * * *